United States Patent
Fiedler

(10) Patent No.: US 8,794,208 B2
(45) Date of Patent: Aug. 5, 2014

(54) PISTON FOR AN INTERNAL COMBUSTION ENGINE

(75) Inventor: Rolf-Gerhard Fiedler, Wendlingen (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 13/293,358

(22) Filed: Nov. 10, 2011

(65) Prior Publication Data
US 2013/0008405 A1   Jan. 10, 2013

(30) Foreign Application Priority Data
Nov. 13, 2010   (DE) .................. 10 2010 051 319

(51) Int. Cl.
*F02F 3/00* (2006.01)
(52) U.S. Cl.
USPC .......................................... 123/193.6; 92/223
(58) Field of Classification Search
CPC ............................... F02F 3/10; F02F 3/105
USPC ............. 123/193.6, 193.4; 92/158, 159, 160, 92/208, 209, 223; 427/190, 427, 475, 180, 427/189
See application file for complete search history.

(56) References Cited

U.S. PATENT DOCUMENTS

| | | | | |
|---|---|---|---|---|
| 2,817,562 A | * | 12/1957 | Fleming et al. | 92/155 |
| 3,945,893 A | * | 3/1976 | Ishimori et al. | 205/109 |
| 4,018,949 A | * | 4/1977 | Donakowski et al. | 427/327 |
| 4,648,309 A | * | 3/1987 | Schellmann | 92/233 |
| 4,656,711 A | * | 4/1987 | Yagi et al. | 29/888.04 |
| 5,239,955 A | * | 8/1993 | Rao et al. | 123/193.4 |
| 5,314,717 A | * | 5/1994 | Alt | 427/282 |
| 5,486,299 A | * | 1/1996 | Fuwa et al. | 508/106 |
| 5,487,364 A | * | 1/1996 | Takeda et al. | 123/193.6 |
| 5,560,283 A | * | 10/1996 | Hannig | 92/223 |
| 5,884,600 A | * | 3/1999 | Wang et al. | 123/193.6 |

(Continued)

FOREIGN PATENT DOCUMENTS

| | | | | |
|---|---|---|---|---|
| BE | 391607 A | | 10/1932 | |
| DE | 198 29 349 | | 1/2000 | |
| EP | 1 692 384 | | 8/2006 | |
| EP | 1 840 419 A1 | | 10/2007 | |
| JP | 2001-280496 | | 10/2001 | |
| JP | 2010-106724 | | 5/2010 | |
| WO | WO9513191 | * | 5/1995 | ............ B41F 16/00 |

OTHER PUBLICATIONS

"Benutzerhandbuch Spaltströmungssimulation" [User Handbook Gap Flow Simulation], Version 2.0, Institute for Fluid Technology Drives and Controls of the Rhineland-Westphalia Technical University in Aachen 2008, pp. 13 to 14. (with English translation of the relevant parts) (Spec, pgs. 11-12).
German Search Report dated Sep. 21, 2011 in German Application No. 10 2010 051 319.9 with English translation of relevant parts.

*Primary Examiner* — Hung Q Nguyen
(74) *Attorney, Agent, or Firm* — Collard & Roe, P.C.

(57) ABSTRACT

A piston for an internal combustion engine has a piston head and a piston skirt delimited by a lower skirt edge. The piston skirt has a working surface assigned to its major thrust side (DS) and a working surface assigned to its minor thrust side (GDS), and a zone is assigned to each of the two working surfaces, which zone proceeds from the lower skirt edge and is exposed to a maximal stress during operation of the internal combustion engine. The zone of the working surface assigned to the major thrust side (DS) and/or the zone of the working surface assigned to the minor thrust (GDS) side is provided with a coating that has grooves that run vertically.

8 Claims, 2 Drawing Sheets

(56) References Cited

U.S. PATENT DOCUMENTS

Figure 1:
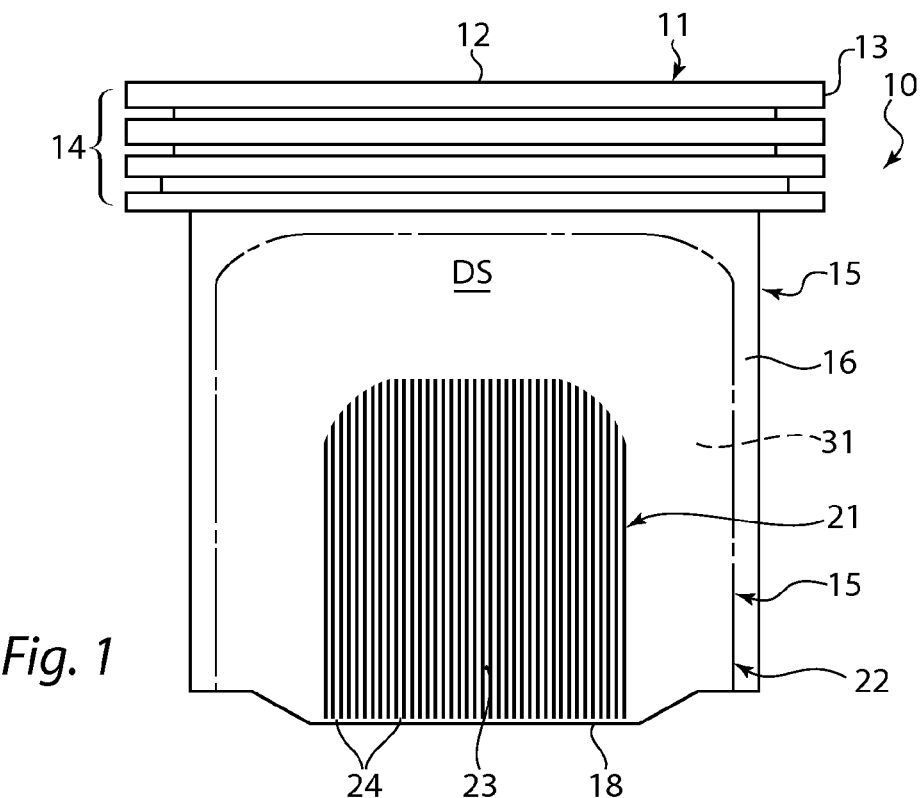

| | | | |
|---|---|---|---|
| 6,863,922 B2 * | 3/2005 | Ogihara et al. | 427/190 |
| 7,287,459 B2 | 10/2007 | Tabata et al. | |
| 7,833,609 B2 * | 11/2010 | Fujita et al. | 428/174 |
| 2005/0005892 A1 | 1/2005 | Nishimura et al. | |
| 2005/0087166 A1 | 4/2005 | Rein et al. | |
| 2006/0117947 A1 * | 6/2006 | Tabata et al. | 92/223 |
| 2009/0025549 A1 | 1/2009 | Suzuki et al. | |
| 2010/0236516 A1 | 9/2010 | Sasaki | |

* cited by examiner

PISTON FOR AN INTERNAL COMBUSTION ENGINE

CROSS REFERENCE TO RELATED APPLICATIONS

Applicant claims priority under 35 U.S.C. §119 of German Application No. 10 2010 051 319.9 filed on Nov. 13, 2010, the disclosure of which is incorporated by reference.

The present invention relates to a piston for an internal combustion engine, having a piston head and a piston skirt delimited by a lower skirt edge, whereby the piston skirt has a working surface assigned to its major thrust side and a working surface assigned to its minor thrust side, and a zone is assigned to the two working surfaces, in each instance, which zone proceeds from the lower skirt edge and is exposed to maximal stress during operation of the internal combustion engine.

A piston of this type is disclosed in DE 198 29 349 A1. A lubricant insert is provided not only in the region of the major thrust side but also in the region of the minor thrust side of the piston. As a result, the regions of the working surfaces that are particularly subject to stress because of the lateral force that is caused during operation, due to the deflection of the connecting rod, are lubricated.

However, even such a lubricant insert loses its effect after a certain time, because the coating is worn away, little by little, as a result of the stresses that occur during operation of the internal combustion engine.

The task of the present invention consists in further developing a piston of the stated type, in such a manner that lubrication of the regions of the working surface that are particularly subject to stress is ensured over the longest possible period of operation.

The solution consists in that the zone of the working surface assigned to the major thrust side and/or the zone of the working surface assigned to the minor thrust side is provided with a coating that has grooves that run vertically.

The present invention is based on the recognition that the zones of the working surface that are exposed to maximal stress during operation are lubricated by means of an increased supply of lubricant oil. This increased supply is forced to come about by means of the introduction of vertical grooves in zones having little stress. This brings about the result that the so-called Peklenik factor is increased to a value greater than 1 in these regions. As a result, the flow of the lubricant oil is not hindered in the axial direction of the working surface.

The piston according to the invention is immersed, during operation, in the region of its lower dead-center position, into a region having an increased wall oil film. The lubricant oil penetrates into the grooves and migrates upward in them, in the direction of the piston head. In this manner, the zones of the working surface that are exposed to maximal stress during operation reliably experience additional lubrication with lubricant oil. Because the wear of the lubricant layer during operation is greatly reduced in this way, the groove structure remains in existence over a long period of operation.

Within the scope of this invention, the term "grooves" is understood to mean all structures having elevations and depressions. The shape and the cross-section of the grooves can be configured in any desired manner. The only thing that is essential is that by means of the structure of the zones with little stress, according to the invention, the Peklenik factor in this region is greater than 1.

Advantageous further developments are evident from the dependent claims.

A particularly preferred further development consists in that a further zone is assigned to the working surface assigned to the minor thrust side, in the vicinity of the piston head, which zone is exposed to maximal stress during operation of the internal combustion engine, and that this zone is provided with a coating that has grooves that run horizontally, or a cross-hatch pattern, or a perforation grid pattern.

The piston according to the invention is supplied with lubricant oil in known manner, during operation. However, the lubricant oil flows away relatively rapidly from the upper region of the working surface, i.e. the region in the vicinity of the piston head, in the direction of the lower skirt edge. In this region, the working surface has a further zone with maximal stress on the minor thrust side. The configuration of this zone, according to the invention, with grooves that run horizontally, or a cross-hatch pattern, or a perforation grid pattern, brings about the result that the Peklenik factor assumes a value less than 1 in this region. As a result, the flow of the lubricant oil in the axial direction of the working surface is inhibited. The lubricant oil penetrates into the grooves or aforementioned patterns and remains in them, in the circumference direction of the working surface. In this manner, this further zone of the working surface reliably experiences additional lubrication with lubricant oil in the region of the minor thrust side, which is exposed to maximal stress during operation. Because the wear of the lubricant layer during operation is greatly reduced in this manner, the groove structure remains in existence over a long period of operation.

Another advantageous embodiment provides that at least one of the coatings is dimensioned in such a manner that it additionally covers a region of the working surface that is exposed to increased stress during operation of the internal combustion engine. This increased stress is less than the maximal stress, but greater than the stress in the remaining regions of the working surface. As a result, not only the regions of maximal stress of the working surfaces, but also regions of greater stress are already additionally supplied with lubricant oil, thereby further increasing the useful lifetime of the piston according to the invention.

The grooves can particularly have a U-shaped, V-shaped, trapezoid-shaped, or rectangle-shaped cross-section. Their width amounts to not more than 1 mm, in an optimal case. The depth of the grooves can correspond to the thickness of the coating, but can also be dimensioned to be smaller. The coating can be printed on, sprayed on, or spread on. The grooves can be introduced into the coating in any desired manner, for example, in known manner, by means of mechanical processing or irradiation, such as, for example, by means of laser beams.

The coating preferably consists of a solid lubricant. The working surfaces outside the zones preferably also have a coating composed of a solid lubricant.

Figure 2:
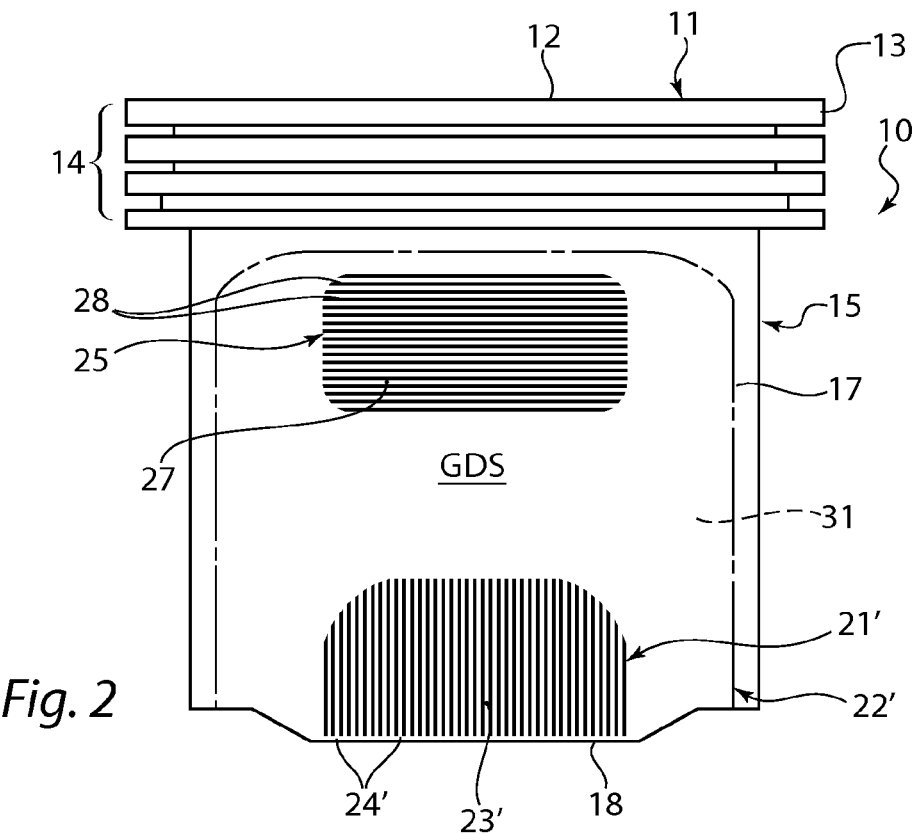

An exemplary embodiment of the present invention will be explained in greater detail below, using the attached drawings. These show, in a schematic representation, not true to scale:

FIG. 1 an exemplary embodiment of a piston according to the invention, in a view of its major thrust side;

FIG. 2 the piston according to FIG. 1 in a view of its minor thrust side.

Figure 3C:
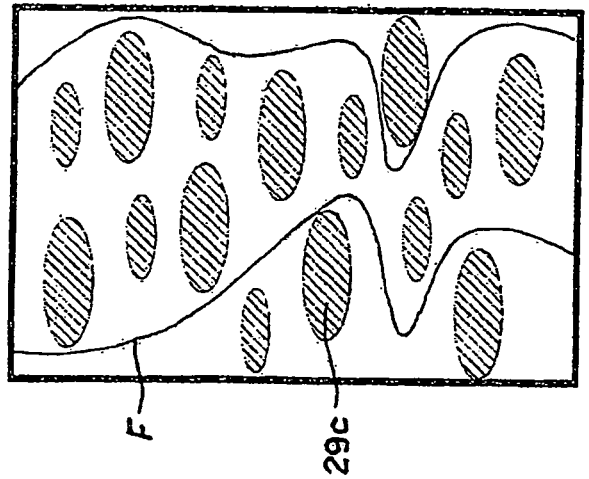
Figure 3B:
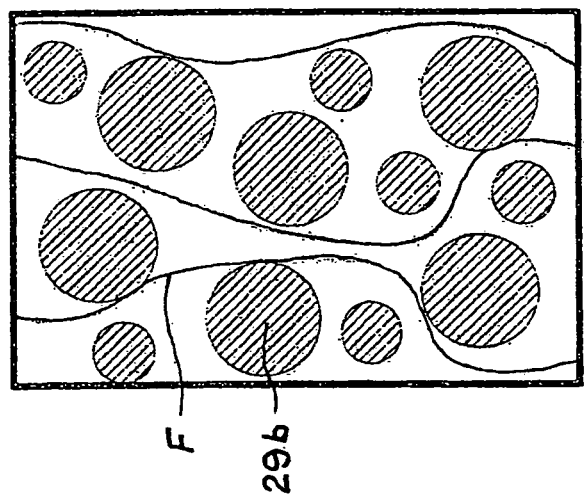
Figure 3A:
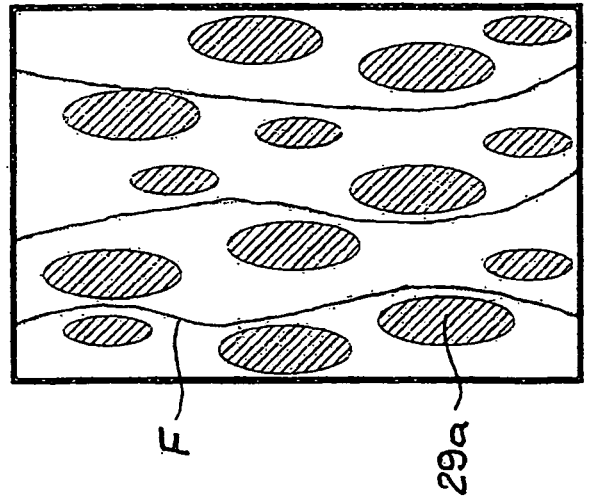

Figures a representation of surface structures having a Peklenik factor γ having the values: γ>1 (FIG. 3a), γ=1 (FIG. 3b), γ<1 (FIG. 3c)

FIGS. 1 and 2 show an exemplary embodiment of a piston 10 according to the invention. The piston 10 can be a one-part or multi-part piston, for example also a composite piston or an articulated piston. The piston 10 can be produced from a steel material and/or a light metal material. FIGS. 1 and 2 show a one-part piston 10 as an example. The piston 10 has a piston head 11 having a piston crown 12, a circumferential top land 13, and a ring belt 14 for accommodating piston rings (not shown). The piston 10 furthermore has a piston skirt 15 having working surfaces 16, 17. The piston skirt 15 is delimited by a lower skirt edge 18. The working surface 16 is assigned to the major thrust side DS of the piston 10 (see FIG. 1), while the working surface 17 is assigned to the minor thrust side GDS of the piston 10 (see FIG. 2). Further known structures of the piston skirt, such as pin boss and pin bore, are not shown, for the sake of a clear illustration. The properties and stress distributions of major thrust side and minor thrust side are described in detail in EP 1 692 384 B1.

The working surface 16 assigned to the major thrust side DS of the piston 10 has a zone 21 that proceeds from the lower skirt edge 18 and is exposed to little stress during operation. The zone 21 is surrounded by a region 22 that is exposed to greater stress during operation. In the exemplary embodiment, the zone 21 is provided with a coating 23 in the form of grooves 24 that run vertically.

In the exemplary embodiment, the coating 23 consists of a solid lubricant, for example Grafal®, graphite, molybdenum sulfite, polytetrafluoroethylene (PTFE), and others. The coating process can take place in known manner, particularly by means of printing, for example using the screen-printing method, by means of spraying, or by means of spreading the solid lubricant on. The grooves 24 can be introduced into the coating 23 in any desired manner. The coating 23 can be applied uniformly and the grooves 24 can be introduced into the coating 23 subsequently, by means of mechanical processing or by means of irradiation, for example with laser beams. However, the coating 23, with the grooves 24, can also be applied to the working surface 16 in one work step, for example by applying the solid lubricant using a stencil. The cross-section of the grooves 24 can be selected in any desired manner. The depth of the grooves 24 maximally corresponds to the thickness of the coating 23. The width of the grooves 24 amounts to not more than 1 mm, in an optimal case.

The working surface 17 assigned to the minor thrust side GDS of the piston 10 also has a zone 21' that proceeds from the lower skirt edge 18 and is exposed to little stress during operation. The zone 21' is surrounded by a region 22' that is exposed to increased stress during operation. In the exemplary embodiment, the zone 21' is provided with a coating 23' in the form of grooves 24' that run vertically. The coating 23' with the grooves 24' corresponds to the coating 23 with the grooves 24 that has been applied to the working surface assigned to the major thrust side DS of the piston 10. For this reason, reference is made to the above description of the major thrust side DS of the piston 10 in this regard.

The working surface 17 assigned to the minor thrust side GDS of the piston 10 has a further zone 25 that is disposed in the vicinity of the piston head 11 and is exposed to little stress during operation. In the exemplary embodiment, the zone 25 is provided with a coating 27 in the form of grooves 28 that run vertically. The coating 27 with the grooves 28 corresponds to the coating 23 with the grooves 24 that is applied to the working surface assigned to the major thrust side DS of the piston 10. For this reason, reference is made to the above description of the major thrust side DS of the piston 10 in this regard.

The zones 22 and 22', respectively, of the working surfaces 16 and 17, respectively, are exposed to maximal stress during operation and are lubricated, according to the invention, by means of an increased supply of lubricant oil. This increased supply is forced to come about by means of the introduction of the vertical grooves 24 and 24', respectively, in the zones 21 and 21', respectively. This brings about the result that the so-called Peklenik factor is increased to a value greater than 1 in these regions. The piston 10 according to the invention is immersed, during operation, in the region of its lower dead-center position, into a region having an increased wall oil film. The lubricant oil penetrates into the grooves 24, 24' and migrates upward in them, in the direction of the piston head 11, on the basis of the capillary forces. In this manner, the zones 22 and 22', respectively, of the working surfaces 16 and 17, respectively, that are exposed to maximal stress during operation reliably experience additional lubrication with lubricant oil. Because the wear of the lubricant layer during operation is greatly reduced in this way, the groove structure remains in existence over a long period of operation.

The zone 25 of the working surface 17 is also exposed to maximal stress during operation. The configuration of this zone 25 according to the invention, with grooves 28 that run horizontally, brings about the result that the Peklenik factor assumes a value less than 1 in this region. As a result, the flow of the lubricant oil in the axial direction of the working surface 17 is inhibited. The lubricant oil penetrates into the grooves 28 and is distributed in them, in the circumference direction of the working surface 17. In this manner, this further zone 25 of the working surface 17 reliably experiences additional lubrication with lubricant oil in the region of the minor thrust side, which is exposed to maximal stress during operation. Because the wear of the lubricant layer during operation is greatly reduced in this manner, the groove structure remains in existence over a long period of operation.

The Peklenik factor $\gamma$ is the ratio of the half-radius of the roughness tips $29a$, $29b$, $29c$ present on the surface in the axial direction to their half-radius in the circumference direction. A value greater than 1 corresponds to an orientation of elliptical roughness tips $29a$ in the axial direction of the working surface (see FIG. $3a$), a value less than 1 corresponds to an orientation of elliptical roughness tips $29c$ in the circumference direction of the working surface (see FIG. $3c$), and a value equal to 1 means that essentially spherical roughness tips $29b$ are present (see FIG. $3b$; see, in this regard, also "Benutzerhandbuch Spaltströmungssimulation" [User Handbook Gap Flow Simulation], Version 2.0, Institute for Fluid Technology Drives and Controls of the Rhineland-Westphalia Technical University in Aachen 2008, pages 13 to 14). The hydrodynamic pressure over a surface having a Peklenik factor $\gamma>1$ is low, i.e. a fluid F can flow in relatively unhindered manner. In contrast to this, the hydrodynamic pressure over a surface having a Peklenik factor $\gamma<1$ is high, i.e. the fluid F is inhibited in terms of its flow. The hydrodynamic pressure over a surface having a Peklenik factor $\gamma=1$ lies between these two extremes.

The remaining regions of the working surfaces 16, 17 outside of the zones 21, 21', 25 or the regions 22, 22' are also provided with a coating 31, in the exemplary embodiment, consisting of a solid lubricant, for example Grafal®, graphite, molybdenum sulfite, polytetrafluoroethylene (PTFE), and others, as indicated with a broken line in FIGS. 1 and 2.

The invention claimed is:
1. Piston (10) for an internal combustion engine, having a piston head (11) and a piston skirt (15) delimited by a lower skirt edge (18),
   wherein the piston skirt (15) has a working surface (16) assigned to its major thrust side (DS) and a working surface (17) assigned to its minor thrust side (GDS), and
   wherein a first zone (21) is assigned to the working surface (16) of the major thrust side (DS) and surrounded by a region (22) exposed to greater stress during operation of the internal combustion engine than the first zone (21), and wherein a second zone (21') is assigned to the working surface (17) of the minor thrust side (GDS) and surrounded by a region (22') exposed to greater stress during operation of the internal combustion engine than the second zone (21'), wherein the first and second zones (21, 21') proceed from the lower skirt edge (18), wherein the zone (21) of the working surface (16) assigned to the major thrust side (DS) and/or the zone (21') of the working surface assigned to the minor thrust side (GDS) is provided with a coating (23, 23') that has grooves (24, 24') that run vertically proceeding from the lower skirt edge (18) in such a manner that, during operation of the internal combustion engine, lubricant oil penetrates into the grooves (24, 24') and the regions (22, 22') experience additional lubrication.

2. Piston according to claim 1, wherein a third zone (25) is assigned to the working surface (17) assigned to the minor thrust side (GDS), in the vicinity of the piston head (11), which third zone, during operation of the internal combustion engine, is exposed to a load that is higher than the certain load the first and second zones are exposed to, and wherein this zone (25) is provided with a coating (27) that has grooves (28) that run horizontally.

3. Piston according to claim 1, wherein the grooves (24, 24', 28) have a U-shaped, V-shaped, trapezoid-shaped or rectangle-shaped cross-section.

4. Piston according to claim 1, wherein the grooves (24, 24', 28) have a width of not more than 1 mm.

5. Piston according to claim 1, wherein the grooves (24, 24', 28) have a certain depth and the coatings have a certain thickness, and wherein the depth of the grooves (24, 24', 28) corresponds to the thickness of the coatings (23, 27).

6. Piston according to claim 1, wherein the coatings (23, 23', 27) are printed, sprayed, or spread on.

7. Piston according to claim 1, wherein the grooves (24, 24', 28) are introduced into the coatings by mechanical processing or by irradiation.

8. Piston according to claim 1, wherein the coatings (23, 23', 27) consist of a solid lubricant.

* * * * *